June 19, 1934.  H. C. BOWEN  1,963,114
HYDRAULIC BRAKE MECHANISM
Filed April 12, 1929
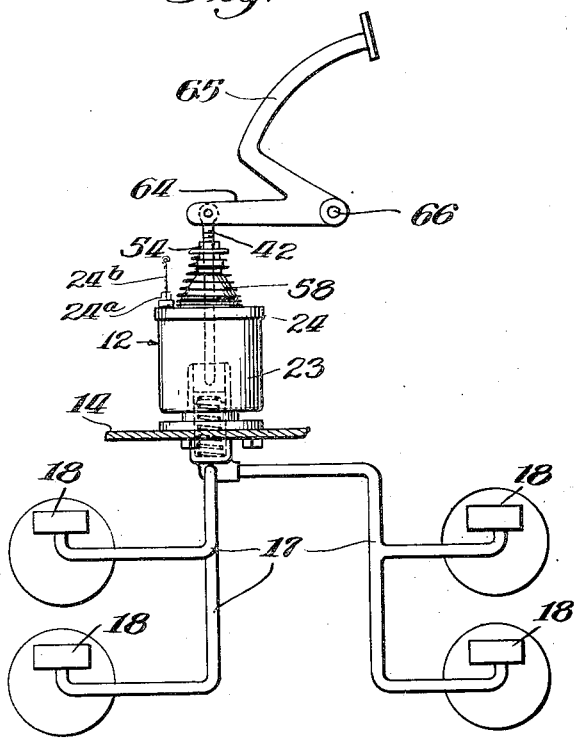
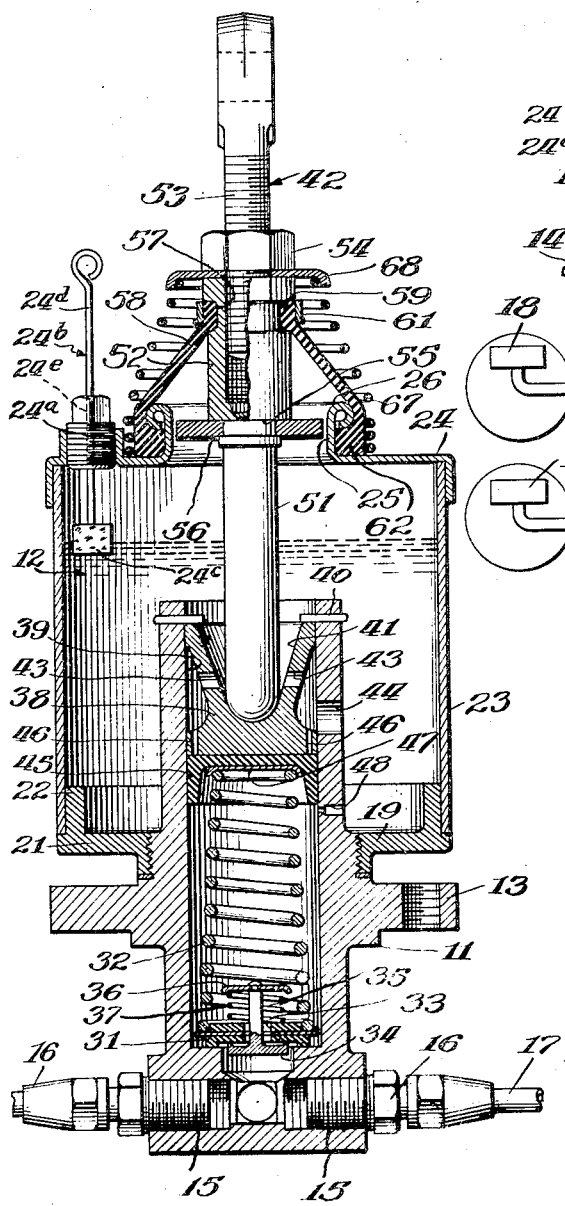
Inventor
Herbert C. Bowen
By Williams Bradbury
McCaleb & Hinkle
Attys.

Patented June 19, 1934

1,963,114

UNITED STATES PATENT OFFICE 1,963,114

HYDRAULIC BRAKE MECHANISM

Herbert C. Bowen, Detroit, Mich., assignor to Hydraulic Brake Company, Los Angeles, Calif., a corporation of California Application April 12, 1929, Serial No. 354,465

9 Claims. (Cl. 60—54.6)

My invention relates to brake mechanism and more particularly to a master cylinder and fluid reservoir assembly for a hydraulic brake mechanism.

One of the difficulties involved in constructing a master cylinder for a hydraulic brake system is to provide an actuating means for the piston of the cylinder which will allow the cylinder to be sealed against the admission of air. The presence of even small quantities of air in the master cylinder or fluid system interferes materially with the proper operation of the brake system on account of the high compressibility of air.

An object of the invention is to provide an improved master cylinder assembly for a hydraulic brake system.

A further object is to provide a master cylinder having a comparatively direct connection with the brake actuating pedal.

A further object is to provide a unitary master cylinder and reservoir comprising relatively few parts and sturdy in construction.

A further object is to provide a master cylinder in which the end of the cylinder is submerged and sealed against the admission of air by the fluid in the fluid reservoir.

A further object is to provide a vertically arranged master cylinder in a fluid reservoir having a piston chamber actuated through the top of the reservoir.

A further object is to provide a vertically arranged master cylinder in a fluid reservoir, having means outside of said reservoir for returning the brake pedal to normal position.

Referring to the drawing:

Fig. 1 illustrates a somewhat schematic view of a hydraulic brake system embodying my invention; and Fig. 2 is a sectional view through the master cylinder and reservoir.

The invention comprises in general a master cylinder 11 and a fluid reservoir 12. The master cylinder consists of a casting having a radially extending flange 13 integral therewith by means of which the apparatus may be secured to a plate 14 secured to the motor vehicle. The lower end of the cylinder is closed and is provided with a plurality of tubular apertures 15 which are threaded to receive plugs 16 by means of which connection is made to tubes 17, two of which lead to the wheel brake cylinders 18 of the front wheels, the other leading to the wheel brake cylinders 18 of the rear wheels.

Immediately above the flange 13 the cylinder is provided with an enlarged portion which is threaded and receives the cup-shaped base 19 of the fluid reservoir.

The cup-shaped base comprises a radially extending flange 21 which is turned upwardly, forming an axially extending flange 22. The outer periphery of flange 22 is reduced for a portion of its length to receive a tubular container 23, which may be soldered or welded to the flange.

The top of the container or fluid reservoir is provided with a cap 24 which may be permanently secured thereto as by welding or the like.

The reservoir 12 is provided with a filling plug 24a screw threaded into a suitable aperture in the cap 24.

A fluid level indicator 24b is also provided for the reservoir 12 and may comprise a float 24c, and an indicating stem 24d which is rigidly secured to said float and extends upward through a hole 24e in the filling plug above the reservoir.

The cap 24 is provided with a circular aperture and the inner edge of the cap is turned upwardly, forming a flange 25, and a bead 26 is provided around the upper edge of flange 25.

The discharge end of cylinder 11 is provided with a valve 31 which is held against the end of the cylinder by means of a spring 32. Valve 31 is provided with a central aperture 33 which is normally closed by a second valve 34. Valve 34 is provided with a valve stem 35 extending through aperture 33 and provided with a cap 36.

Interposed between valve 31 and cap 36 is a spring 37 for normally retaining the valve 34 in its closed position. The upper end of the cylinder is provided with a piston 38 having a deep annular recess 39 therein and provided with a deep pocket 41 for receiving the end of a plunger 42. The pocket 41 and recess 39 are in fluid communication through a plurality of passages 43. Recess 39 also communicates with the fluid reservoir through a large aperture 44.

The face of the piston is provided with a packing cup 45 which normally closes passages 46 in the face of the piston. One end of the spring 32 rests against a washer 47 which retains the packing cup in contact with the piston face.

During the forward movement of the piston a fluid pressure will be produced within the master cylinder, causing valve 34 to be unseated and allowing the fluid to pass into the fluid lines 17 to the wheel brake cylinders 18. Upon the release of the downward force upon the piston spring 32 will tend to return the piston to its retracted position, producing a lower than atmospheric pressure within the cylinder. However, a higher than atmospheric pressure will be maintained in the fluid lines and wheel brake cylinders due to the fact that spring 32 tends to retain valve 31 upon its seat, allowing the fluid to return to the master cylinder under the restraint of the valve.

The low pressure in the master cylinder during the retraction of the piston causes the packing cup 45 to uncover the passages 46 and allow fluid from the fluid reservoir to enter the master cylinder. After the piston has reached its retracted position, which is limited by a plurality of pins 40 projecting through the wall of the cylinder, fluid will continue to enter the cylinder from the fluid lines and a passage 48 is provided in the cylinder wall immediately in front of the retracted position of the piston to allow the excess fluid to return to the fluid reservoir, thus insuring that the master cylinder and fluid lines will at all times be provided with a sufficient quantity of fluid.

The plunger 42 comprises a rod 51 which engages the pocket in the piston. The upper end of rod 51 is provided with a threaded coupling member 52 into which a link 53 may be threaded, thus providing an adjustment for the length of the plunger. A lock nut 54 serves to maintain the adjustment of the length of the plunger. The base of coupling 52 is provided with a groove 55 in which a washer 56 is seated. Upon a downward movement of the plunger washer 56 limits the extent of this movement by engaging the top of the master cylinder. The coupling member is also provided with an annular groove 57 for receiving one end of a flexible boot 58 of rubber or other suitable material. The upper end of the boot is provided with a bead 59 which is retained upon the coupling by being forced into the annular groove 57 by a ring 61.

Boot 58 is cone-shaped and at its lower end is provided with a bead 62 which may be stretched and snapped over the bead 26 of flange 25 to provide a fluid tight seal at this point. The upper end of plunger 42 is pivotally connected to an arm 64 of brake pedal 65. Brake pedal 65 is pivotally mounted upon the frame of the motor vehicle at 66. A brake pedal return spring 67 is disposed between the cap 24 and a spring retainer 68. The spring retainer is secured in position between the lock nut 54 and the end of coupling member 52. Spring 67 is coiled around bead 62 of boot 58, further increasing the effectiveness of the seal between bead 62 and flange 25. In order to apply the brakes the operator depresses pedal 65, resulting in a downward movement of plunger 42 to actuate the piston and produce a fluid pressure in the system for applying the brakes.

The downward movement of plunger 42 provides sufficient slack in the flexible boot 58 to allow the plunger 42 to move slightly to the right as viewed in Fig. 1 as arm 64 moves about its pivot point 66. When the brake pedal is released after an application of the brakes, the brake pedal 65 and plunger 42 will at once return to normal position due to the action of spring 67, and piston 38 will gradually follow in the manner previously described.

The apparatus described, on account of its extreme simplicity, is cheap to manufacture and accomplishes the application of the brakes with remarkable efficiency.

Having described the nature and embodiments of my invention, what I desire to secure by United States Letters Patent is as follows:

1. In a brake mechanism, a vertical master cylinder, a piston movable therein, a flange surrounding the cylinder, a fluid reservoir including said flange as a base and a tubular container on the flange forming a wall of the reservoir, a cap secured to the tubular member, a plunger extending through said cap into the reservoir for operating the piston, said plunger forming a separable abutting connection with said piston, a retainer on said plunger above said reservoir, means for actuating the plunger whereby a fluid pressure is produced in the master cylinder, and spring means external of the reservoir and supported thereon and interposed between the cap and said retainer for independently restoring said actuating means to normal position.

2. In a brake mechanism, a fluid reservoir including a base, a tubular container secured to the base and a cover cap secured over the open end of the tubular container, a master cylinder fixed to said base and extending into the reservoir, a piston for the master cylinder, a plunger extending through said cap into the reservoir for actuating the piston to produce a fluid pressure in the cylinder, said plunger forming a separable connection with said piston, and a flexible compression member seated on said cap and operably interposed between the plunger and said cap for urging said plunger to normal position.

3. In a hydraulic brake system, a master cylinder, a piston movable therein, a fluid reservoir enclosing one end of the master cylinder, said reservoir having an opening therein and a flange surrounding the opening, a plunger extending through said opening for actuating the piston, said plunger having a separable connection with said piston, and a flexible member provided with upper and lower peripheral beads engaging annular grooves in the plunger and in said flange for closing said opening to prevent dirt from entering the reservoir, and a compression coil spring surrounding said flexible member to protect the same and to urge the plunger to normal position.

4. In a hydraulic brake system, a master cylinder, a piston movable therein, a fluid reservoir enclosing one end of the master cylinder, a cap for the reservoir provided with an aperture, a plunger extending through said aperture for actuating the piston of the master cylinder, said plunger having a separable connection with said piston, and a flexible boot surrounding and having its upper end fixed to the plunger, a flange on the cap engaged by the lower end of said boot for closing said aperture to exclude dirt from the reservoir, and a yieldable compression member operably interposed between said cap and said plunger for urging the plunger upwardly.

5. In a hydraulic brake system, a master cylinder, a piston movable therein, a fluid reservoir enclosing one end of the master cylinder, a cap for the reservoir provided with an aperture, a plunger extending through said aperture for actuating the piston of the master cylinder, said plunger forming a separable connection with said piston, and a flexible boot surrounding the plunger for closing said aperture to exclude dirt from the reservoir, and means surrounding said boot for restoring said plunger to normal position.

6. In a brake mechanism, a fluid reservoir, a vertically disposed master cylinder, a piston movable therein, a cap secured to the open end of the reservoir and including a vertical annular flange, a plunger extending into the reservoir through an opening in the cap for actuating said piston, said plunger having a separable connection with said piston, a flexible member surrounding and having its upper end secured to said plunger and its lower end engaging said flange on the cap of said reservoir, and spring means surrounding said flexible member for securing same to said flange and yieldingly urging said plunger to its normal position.

7. In a brake mechanism, a fluid reservoir, a vertically disposed master cylinder, a piston movable therein, a plunger extending into the reservoir for actuating said piston, a flexible member surrounding said plunger and engaging a flange on the top of said reservoir and spring means surrounding said flexible member for securing same to said flange and for restoring said plunger to normal position.

8. In a brake mechanism of the class described, the combination of a vertical master cylinder, a piston movable therein, a flange surrounding the cylinder, a laterally extending port in said cylinder spaced a short distance above said flange, a fluid reservoir including said flange as a base and a sheet metal tubular container on the flange forming a wall of the reservoir, a sheet metal cap secured to the tubular container, a stop for said piston, a return spring normally holding said piston against said stop, said port being uncovered when said piston rests against said stop, a plunger extending through said cap into the reservoir for operating the piston, said plunger forming a separable abutting connection with said piston, a retainer on said plunger above said reservoir, means for actuating the plunger whereby a fluid pressure is produced in the master cylinder, and spring means external of the reservoir and supported thereon and interposed between the cap and said reservoir for independently restoring said actuating means to normal position.

9. In a hydraulic brake system of the class described, the combination of a master cylinder, a piston movable therein, a fluid reservoir enclosing one end of the master cylinder, a cap for the reservoir provided with an aperture, a plunger extending through said aperture for actuating the piston of the master cylinder, said plunger having a separable connection with said piston, a stop for said piston, a spring normally holding said piston against said stop, a rubber boot surrounding and having its upper end fixed to the plunger, a flange on the cap engaged by the lower end of the boot for closing said aperture to exclude dirt from the reservoir, and a compression spring operably interposed between said cap and said plunger for urging the plunger upwardly.

HERBERT C. BOWEN.